Patented July 23, 1940

2,208,701

UNITED STATES PATENT OFFICE 2,208,701

METHOD OF AND COMPOSITION FOR TEMPERING LEATHER

Laurence Edward Puddefoot, Leicester, England, assignor to United Shoe Machinery Corporation, Borough of Flemington, N. J., a corporation of New Jersey No Drawing. Application October 8, 1938, Serial No. 233,960. In Great Britain October 26, 1937

5 Claims. (Cl. 69—21)

This invention relates to the treatment of leather and more particularly to the tempering or mulling thereof in the course of shoe manufacture.

In the manufacture of shoes it is common practice to temper outsoles prior to their attachment to shoes. This is ordinarily accomplished by wetting the outsoles with water and then storing them in wet condition for a substantial period, for example, over night, to allow the water to penetrate the leather soles as well as possible and bring them to the desired workable or mulled condition. During such storage, molds have been known to form on the leather.

Certain difficulties, however, are associated with the treatment of leather in the above-described manner. Thus, the sequence of shoemaking operations during which it is desired that the soles be in temper may occupy many hours, and once the soles have been introduced into this sequence of operations and exposed to the atmosphere of the factory they tend to dry comparatively rapidly to a condition which may require re-wetting of the outsoles. Such re-wetting is accompanied by increased possibility of the staining of the grain surface of the outsoles.

An object of the invention is to provide an advantageous method and composition for use in the tempering or mulling of leather whereby tempered leather, for example, sole leather, may be caused to remain in tempered or mulled condition throughout a relatively long sequence of shoe manufacturing operations without requiring re-wetting of the leather.

In accordance with the above and other objects the present invention contemplates subjecting leather to the action of sodium lactate in the presence of water to produce a tempering effect of relatively long duration. The leather also may be treated with a mold preventive or disinfectant and, to promote penetration of the leather by the tempering fluid, a wetting agent may be employed. The leather treatment, according to the present invention, preferably is accomplished by preparing an aqueous composition containing the desired ingredients and then wetting the leather with the composition.

The sodium lactate may be employed in the form of commercial syrupy sodium lactate containing about 80% sodium lactate and 20% water. The commercial sodium lactate may be present in the aqueous tempering fluid with which the leather is treated to the extent of a small percentage in the neighborhood of 1%, or expressed otherwise, in the proportion of about 1 to 2½ grams of syrupy sodium lactate to 100 cubic centimeters (100 grams) of water, or, in other units, in the neighborhood of 1 to 4 ounces avoirdupois of syrupy sodium lactate to the U. S. gallon of water.

A suitable mold preventative or disinfectant which may be associated with the tempering composition is a material known commercially as "Cresantol 9$^s$", and which is a sodium salt of parachlormetacresol. Such mold preventative advantageously may be present in the tempering composition to the extent of about 0.15 gram per 100 cc. (100 grams) of water. A wetting agent such as saponin may be present in small proportion, for example, 0.05 to 0.10 gram per 100 cc. (100 grams) of water.

It should be noted that the above ingredients are all readily soluble in hard water so that the efficacy of the tempering fluid is not dependent upon the degree of hardness or softness of the water which may be available for tempering purposes.

In practicing the present invention it is convenient first to form a concentrate by mixing the leather treating ingredients, for example sodium lactate, a mold preventative or disinfectant, and a wetting agent, and subsequently diluting such concentrate with water in suitable proportions at the time of associating the tempering fluid with the leather to be treated. Thus, referring to the materials disclosed herein by way of specific example, such concentrate may be prepared by mixing sodium lactate, "Cresantol 9$^s$", and saponin in the proportions of 1 to 2.5 parts by weight of syrupy sodium lactate, 0.15 part of "Cresantol 9$^s$", and 0.05 to 0.10 part of saponin. The above specified ingredients are compatible so as to form a concentrate of homogeneous nature. When the leather is to be tempered, the concentrate may be mixed with water to provide the proportions mentioned above in connection with the individual ingredients, or, further by way of example, the dilution might be in the proportion of 50 cc. (50 grams) of water for each gram of concentrate.

In tests made with compositions containing sodium lactate to the extent referred to hereinabove it was demonstrated that by following the practice of the present invention, it was readily possible to make certain that leather outsoles would be in the requisite tempered condition upon reaching certain shoemaking machines and operations, having in mind the fact that the progress of such outsoles through the factory might be slow and of variable rate. It was found, moreover, that outsoles brought into temper with tempering fluid containing sodium lactate and then exposed to the normal drying influences in shoe manufacture still possessed a useful degree of temper 24 hours or more after such exposure. Ultimately, however, upon drying of the shoe leather beyond the tempered stage, a satisfactory dry, firm condition of the outsole and shoe to which it had become attached was obtained.

The invention has shown further advantages in that not only has there been freedom from mold formation but there has been a greater freedom from stains in the case of leather soles tempered in accordance with this invention than in the case of soles tempered in the conventional manner.

Having described my invention, what I claim as new and desire to secure by Letters Patent of the United States is:

1. That improvement in methods of tempering leather which comprises treating said leather with water and simultaneously associating sodium lactate with said leather, whereby the leather after becoming tempered will remain in temper for a relatively long period of time.

2. An aqueous leather tempering composition containing a small percentage of sodium lactate.

3. A leather tempering composition comprising sodium lactate, a mold preventing disinfectant, and water.

4. A leather tempering composition comprising sodium lactate, a mold preventing disinfectant, a wetting agent, and water.

5. A leather tempering composition comprising sodium lactate, a mold preventing disinfectant, saponin, and water.

LAURENCE EDWARD PUDDEFOOT.